(12) United States Patent
Gilula

(10) Patent No.: US 8,103,654 B2
(45) Date of Patent: Jan. 24, 2012

(54) SYSTEM AND METHOD FOR QUERYING HETEROGENEOUS DATA SOURCES

(76) Inventor: Mikhail Gilula, Foster City, CA (US)

( * ) Notice: Subject to any disclaimer, the term of this patent is extended or adjusted under 35 U.S.C. 154(b) by 734 days.

(21) Appl. No.: 11/833,218

(22) Filed: Aug. 2, 2007

(65) Prior Publication Data

US 2009/0006348 A1   Jan. 1, 2009

Related U.S. Application Data

(60) Provisional application No. 60/929,414, filed on Jun. 26, 2007.

(51) Int. Cl.
*G06F 17/00* (2006.01)

(52) U.S. Cl. ......................................... 707/713; 707/715

(58) Field of Classification Search ............ 707/999.01, 707/719, 713; 709/217
See application file for complete search history.

(56) References Cited

U.S. PATENT DOCUMENTS

| 7,353,246 | B1* | 4/2008 | Rosen et al. | 709/202 |
| 2004/0143644 | A1* | 7/2004 | Berton et al. | 709/217 |
| 2008/0059453 | A1* | 3/2008 | Laderman | 707/5 |

\* cited by examiner

*Primary Examiner* — Belix M Ortiz
(74) *Attorney, Agent, or Firm* — Fernandez & Associates, Inc.

(57) ABSTRACT

A system and method for querying heterogeneous data sources is disclosed. In some embodiments, the system comprises a plurality of heterogeneously structured data sources, a plurality of query objects that represent queries to the data sources and that are independent of the structure of the data sources, and a user interface configured to query the plurality of query objects.

5 Claims, 11 Drawing Sheets

```
BRAND string =[ MANUFACTURER ];
COPIER_B {...};
COPIER_C {...};
DUPLEX_PRINTING boolean;
FAX_MACHINE_B {...};
FAX_MACHINE_C {...};
LINK url;
MANUFACTURER string  =[ BRAND ];
MAX_PRINT_RESOLUTION { MAX_PRINT_RESOLUTION_HORIZONTAL_DPI
                      ,MAX_PRINT_RESOLUTION_VERTICAL_DPI };
MAX_PRINT_RESOLUTION_HORIZONTAL_DPI numeric;
MAX_PRINT_RESOLUTION_VERTICAL_DPI numeric;
MAX_PRINT_SPEED_BLACK_PPM numeric
MAX_PRINT_SPEED_COLOR_PPM numeric;
MULTIFUNCTION_PERIPHERAL_B { BRAND
                            ,COPIER_B
                            ,FAX_MACHINE_B
                            ,LINK
                            ,MODEL
                            ,PICTURE_JPEG
                            ,PRICE_USD
                            ,PRINTER_B
                            ,SCANNER_B };
MULTIFUNCTION_PERIPHERAL_C { BRAND
                            ,COPIER_C
                            ,FAX_MACHINE_C
                            ,LINK
                            ,MODEL
                            ,PICTURE_JPEG
                            ,PRICE_USD
                            ,PRINTER_C
                            ,SCANNER_C };
PICTURE_JPEG file_jpeg
PRICE_USD money;
PRINTER_B { DUPLEX_PRINTING
           ,LINK
           ,MANUFACTURER
           ,MAX_PRINT_RESOLUTION
           ,MAX_PRINT_SPEED_BLACK_PPM
           ,MODEL
           ,PICTURE_JPEG
           ,PRICE_USD
           ,PRINTING_METHOD };
PRINTER_C { BRAND
           ,DUPLEX_PRINTING
           ,LINK
           ,MAX_PRINT_RESOLUTION
           ,MAX_PRINT_SPEED_BLACK_PPM
           ,MAX_PRINT_SPEED_COLOR_PPM
           ,MODEL
           ,PICTURE_JPEG
           ,PRICE_USD
           ,PRINTING_METHOD };
PRINTING_METHOD string;
SCANNER_B {...};
SCANNER_C {...};
```

FIGURE 3

| Metaobjects | | | | |
|---|---|---|---|---|
| Name | Type or Structure | Standard Instances / Values | Alteration Allowed | Implicit Inclusion |
| ... | ... | ... | ... | ... |
| ADVERTISING_MOVIE_AVI | file_avi | no | n/a | yes |
| ADVERTISING_STRING | string | no | n/a | yes |
| OBJECT_SEMANTICS | string | object-specific | yes | no |
| OBJECT_VERSION | string | object-specific | no | yes |
| ... | ... | ... | ... | ... |

FIGURE 4

```
MULTIFUNCTION_PERIPHERAL_B
{ BRAND
 ,COPIER_B
 ,FAX_MACHINE_B
 ,LINK
 ,MODEL
 ,OBJECT_SEMANTICS = 'Multifunction Monochrome
Peripheral'
 ,PICTURE_JPEG
 ,PRICE_USD
 ,PRINTER_B
 ,SCANNER_B };
 ...
PRINTER_B
{ DUPLEX_PRINTING
 ,LINK
 ,MANUFACTURER
 ,MAX_PRINT_RESOLUTION
 ,MAX_PRINT_SPEED_BLACK_PPM
 ,MODEL
 ,OBJECT_SEMANTICS = 'Monochrome Printer'
 ,PICTURE_JPEG
 ,PRICE_USD
 ,PRINTING_METHOD };
PRINTER_C
{ BRAND
 ,DUPLEX_PRINTING
 ,LINK
 ,MAX_PRINT_RESOLUTION
 ,MAX_PRINT_SPEED_BLACK_PPM
 ,MAX_PRINT_SPEED_COLOR_PPM
 ,MODEL
 ,OBJECT_SEMANTICS = 'Color Printer'
 ,PICTURE_JPEG
 ,PRICE_USD
 ,PRINTING_METHOD };
```

FIGURE 5

```
SELECT *
FROM *
WHERE Contains(manufacturer, '*AnyCase('le')*')
   AND printing_method = 'AnyCase('laser')'
   AND max_print_resolution_horisontal_dpi >= 600
   AND max_print_resolution_vertical_dpi >= 600
   AND duplex_printing = 0
   AND max_print_speed_black_ppm >= 14;
```

FIGURE 7

```
              /********** Query #1 **********/
SELECT *
FROM multifunction_peripheral_b a
WHERE (Contains(a.brand, '*AnyCase('le')*')
 OR Contains(printer_b.manufacturer,'*AnyCase('le')*'))
   AND printing_method = 'AnyCase('laser')'
   AND max_print_resolution_horisontal_dpi >= 600
   AND max_print_resolution_vertical_dpi >= 600
   AND duplex_printing = 0
   AND max_print_speed_ppm >= 14
;
              /********** Query #2 **********/
SELECT *
FROM multifunction_peripheral_c a
WHERE (Contains(a.brand, '*AnyCase('le')*')
       OR Contains(printer_c.brand,'*AnyCase('le')*'))
   AND printing_method = 'AnyCase('laser')'
   AND max_print_resolution_horisontal_dpi >= 600
   AND max_print_resolution_vertical_dpi >= 600
   AND duplex_printing = 0
   AND max_print_speed_black_ppm >= 14
;
              /********** Query #3 **********/
SELECT *
FROM printer_b
WHERE Contains(manufacturer,'*AnyCase('le')*')
   AND printing_method = 'AnyCase('laser')'
   AND max_print_resolution_horisontal_dpi >= 600
   AND max_print_resolution_vertical_dpi >= 600
   AND duplex_printing = 0
   AND max_print_speed_ppm >= 14
;
              /********** Query #4 **********/
SELECT *
FROM printer_c
WHERE Contains(brand, '*AnyCase('le')*')
   AND printing_method = 'AnyCase('laser')'
   AND max_print_resolution_horisontal_dpi >= 600
   AND max_print_resolution_vertical_dpi >= 600
   AND duplex_printing = 0
   AND max_print_speed_black_ppm >= 14
;
```

FIGURE 8

| Query Object | Printer_C |
|---|---|
| Object Semantics | Color Printer |

| | |
|---|---|
| WHY BUY BLACK AND WHITE?! | |
| Price USD | 699.99 |
| Brand | Lexmark |
| Model | C510 Color Laser Printer |
| Printing Method | Laser |
| Duplex Printing | No |
| Max Print Speed Black, ppm | 30 |
| Max Print Speed Color, ppm | 10 |
| Max Print Resolution, dpi | |
| Horizontal | 2400 |
| Vertical | 2400 |
| Link http://www.SuperDuperShopper.com/Lexmark-28S0200-C510-LASER/ | |

FIGURE 10

SYSTEM AND METHOD FOR QUERYING HETEROGENEOUS DATA SOURCES

CROSS REFERENCE TO RELATED APPLICATIONS

This application claims priority to U.S. Provisional Application Ser. No. 60/929,414 entitled "System and Method for Querying Heterogeneously Structured Data," filed Jun. 26, 2007, and incorporated herein by reference.

FIELD OF THE INVENTION

The invention relates generally to systems and methods for querying heterogeneous data sources, and more particularly, to a scalable and secure framework for searching within heterogeneous data sources.

BACKGROUND

Vast amounts of information are contained within structured data sources, such as relational databases, XML documents, flat files, and other storage mechanisms. Generally, a user must understand the schema, or underlying structure and organization, to effectively query these data sources. For example, to effectively query a relational database, a user must know the name of the database, the names of all tables addressed by the query, and the names and data types of all attributes associated with the query. Likewise, when no XML schema is available, a user must extract the structure, attributes, and tags, to effectively query an XML document.

Though necessary, schemas are not sufficient for formulating meaningful queries. Users must also understand the meanings of data elements to extract productive information from the structured data. This presents a serious problem when dealing with multiple disparate data sources because naming conventions may vary significantly across the sources. Names may consist of terms or abbreviations specific to businesses or organizations, or merely be arbitrary identifiers incomprehensible by outsiders. In addition, identical names may carry different meanings in the context of different users. For example, the name "bureau" may mean drastically different things to a government contractor and a furniture supplier.

Security is yet another problem hampering access to structured data. In particular, database schemas may reveal sensitive information that an organization is unwilling to release. For businesses and organizations, databases and data repositories are critical resources that are tightly interconnected with other parts of their infrastructure. Even when some data could be made available for a wider audience and yield commercial or other benefits, allowing access to the data may pose substantial security risks and therefore seldom occurs.

Due to the aforementioned problems, viable options in the field have been limited to two principal approaches. The first is the "federated systems" approach, wherein several databases are integrated into one virtual database and their schemas are combined into a global schema for formulating queries that are programmatically translated into queries to specific databases. The approach presumes knowledge of all related database schemas to build a program for translating the queries. In addition, this federated systems approach is only practical for a relatively small number of databases due to lack of scalability. Adding a new database to a federated system generally requires updating the global schema and the translation program, as well as manual updates to incorporate the changes, both of which are costly and time consuming endeavors.

The second approach exploits "agents," or computer programs using heuristics or artificial intelligence, for translating user queries into queries to physical databases. Agents, however, are similarly hampered in heterogeneous environments by the scalability and security issues discussed above, which limit their adoption for commercial and other pragmatic purposes. Thus, what is needed is a scalable and secure system and method for querying heterogeneous data sources that seamlessly integrates disparate data sources.

BRIEF SUMMARY

A system and method for querying heterogeneous data sources is disclosed. In some embodiments, the system comprises a plurality of heterogeneously structured data sources, a plurality of query objects that represent queries to the data sources and that are independent of the structure of the data sources, and a user interface configured to query the plurality of query objects. In accordance with other embodiments, the method comprises formulating a query that requests information from a plurality of discrete data repositories using at least one query object from a thesaurus of query objects, examining a thesaurus of query objects to convert the query into a plurality of sub-queries, converting the plurality of sub-queries into at least one native query, executing the native query to obtain the information, and converting the information into a structure of at least one of the query objects.

BRIEF DESCRIPTION OF THE DRAWINGS

For a detailed description of exemplary embodiments of the invention, reference will now be made to the accompanying drawings in which:

FIG. 3 shows an exemplary fragment of a thesaurus in accordance with embodiments of the invention;

FIG. 4 illustrates a table of exemplary metaobjects that may be included into query objects in accordance with embodiments of the invention;

FIG. 5 illustrates exemplary query objects after inclusion of the standard metaobjects of FIG. 4 in accordance with embodiments of the invention;

FIG. 7 shows the query of FIG. 6 reformulated using an exemplary structured query language in accordance with embodiment of the invention;

FIG. 8 illustrates sub-queries generated in response to the user input of FIG. 6 in accordance with embodiments of the invention;

FIG. 10 depicts an exemplary instance of a query object produced in response to the query in FIG. 6 in accordance with embodiments of the invention;

NOTATION AND NOMENCLATURE

In the following discussion and in the claims, the terms "including" and "comprising" are used in an open-ended fashion, and thus should be interpreted to mean "including, but not limited to". Also, the term "couple", "couples," or "coupled" is intended to mean either an indirect or direct electrical or communicative connection. Thus, if a first device couples to a second device, that connection may be through a direct connection, or through an indirect connection via other devices and connections. In addition, the term "query object" or "query objects" should be construed as "any representation of a query to a data source that is independent of the schema of the data source." Also, the term "thesaurus" or "thesauri" should be construed as "any abstraction layer that facilitates the querying of heterogeneous data." For example, a thesaurus may comprise one or more query objects. Finally, the term "native query" is intended to mean any query to a data source that is dependent on the structure of the data source.

DETAILED DESCRIPTION

In this disclosure, numerous specific details are set forth to provide a sufficient understanding of the present invention. Those skilled in the art, however, will appreciate that the present invention may be practiced without such specific details. In other instances, well-known elements have been illustrated in schematic or block diagram form in order not to obscure the present invention in unnecessary detail. Additionally, some details have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise.

The following discussion is also directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be illustrative of that embodiment, and not intended to suggest that the scope of the disclosure, including the claims, is limited to that embodiment.

Figure 1:
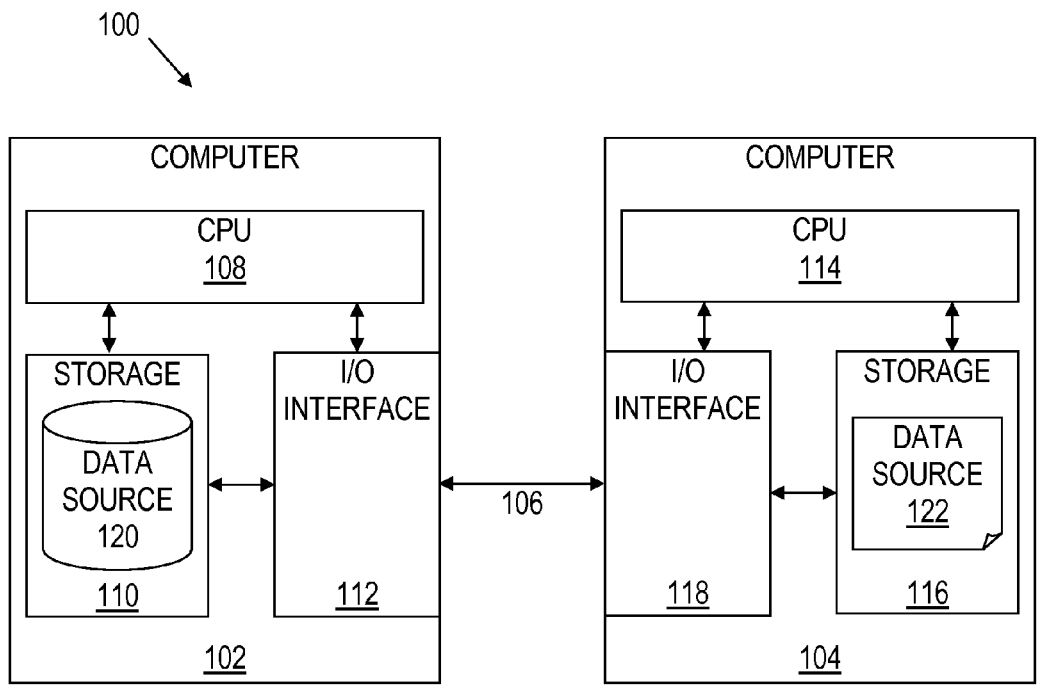
FIG. 1 illustrates a system constructed in accordance with embodiments of the invention.

FIG. 1 illustrates a system 100 constructed in accordance with embodiments of the invention. System 100 comprises a plurality of computers 102 and 104 coupled together through a communications channel 106. The computers 102 and 104 may be any type of computer system, such as a laptop computer, a personal computer, or a stand-alone computer operated as a server. Although not explicitly shown, the communications channel 106 may represent any type of computer network, such as the Internet, a local area network (LAN), and a wide area network (WAN), or any type of communications link created through wire-line or wireless technologies, such as Bluetooth, Infrared, and GSM.

As illustrated in FIG. 1, the computer 102 comprises a central processing unit (CPU) 108, a storage 110, and an Input/Output (I/O) interface 112. Similarly, the computer 104 comprises a CPU 114, a storage 116, and an I/O interface 118.

The computers 102 and 104 may comprise the single CPUs 108 and 114 respectively, or may comprise a plurality of CPUs arranged in a configuration where parallel computing may take place. The CPUs 108 and 114 respectively couple to the storage 110 and 116, which respectively store a data source 120 and 122. The storages 110 and 116 may comprise any type of volatile and/or non-volatile memory, such as random access memory (RAM) and read only memory (ROM), or any other medium for storing information, such as a hard drive, universal serial bus (USB) flash drive, memory stick, cell phone, and iPod®.

The data sources 120 and 122 may comprise a database, a flat-file, an XML file, or any other data repository, such as a partition on a DVD or CD-ROM. The storage 110 and 116 respectively couple to the I/O interfaces 112 and 118 to exchange the information contained within the data sources 120 and 122 between the computers 102 and 104. Although only two computers and data sources are illustrated in FIG. 1, any number of computers and data sources may be used as desired.

Figure 2:
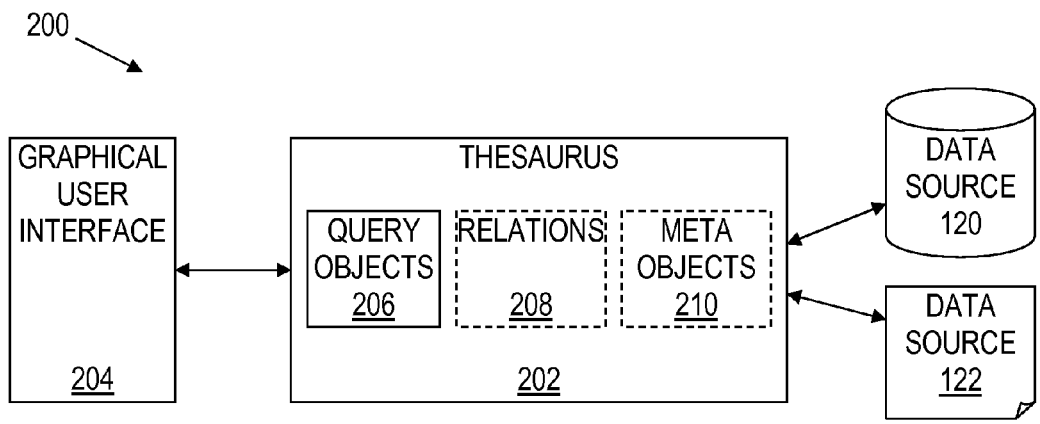
FIG. 2 depicts a framework configured in accordance with embodiments of the invention and used to query the heterogeneous data sources of FIG. 1.

FIG. 2 depicts a framework 200 configured in accordance with embodiments of the invention and used to query the heterogeneous data sources of FIG. 1. As illustrated in FIG. 2, the framework 200 comprises the data sources 120 and 122, a thesaurus 202, and a graphical user interface (GUI) 204. The thesaurus 202 comprises one or more query objects 206, and optionally, one or more relations 208 on the query objects and one or more metaobjects 210. The thesaurus 202 acts as an abstraction layer that facilitates the querying of the heterogeneous data sources 120 and 122. The GUI 204 may interact with the thesaurus 202 to query the data sources 120 and 122. Thus, a user of the GUI 204 may obtain useful information from the data sources 120 and 122 by way of the thesaurus 202 without knowledge of the underlying structure and organization of the data sources 120 and 122. As can be appreciated, the system 100 and framework 200 provide a flexible and scalable means of querying heterogeneous data sources. Although only two data sources 118 and 120 and one thesaurus 202 are illustrated in FIG. 2, any number of data sources and thesauri may be employed as desired. In addition, although the graphical user interface 204 is shown in FIG. 2, any type of user interface may be employed as desired, such as a command line interface, a virtual interface, an auditory interface, and a haptic interface.

FIG. 3 shows an exemplary fragment of a thesaurus in accordance with embodiments of the invention. The exemplary thesaurus fragment includes the following atomic query objects with their associated type: Brand (string), Duplex_printing (boolean), Link (URL—Uniform Resource Locator), Manufacturer (string), Max_print_resolution_horizontal_dpi (numeric), Max_print_resolution_vertical_dpi (numeric), Max_print_speed_black_ppm (numeric), Max_print_speed_color_ppm (numeric), Picture_jpeg (file_jpeg), Price_USD (money), and Printing_method (string). The query objects Brand and Manufacturer are defined as synonyms, or query objects that semantically equivalent. The relation of synonymy is shown by setting Brand equal to Manufacture and Manufacture equal to Brand in the exemplary thesaurus of FIG. 3. Although not explicitly shown, any other type of relationship may be formed between the query objects, such as the relation of antonymy, as desired.

The exemplary thesaurus of FIG. 3 includes the following non-atomic query objects: Copier_B, Copier_C, Fax_machine_B, Fax_machine_C, Max_print_resolution, Multifunction_peripheral_B, Multifunction_peripheral_C, Printer_B, Printer_C, Scanner_B, and Scanner_C. The object Max_print_resolution comprises the atomic objects Max_ print_resolution_horizontal_dpi and Max_print_esolution_vertical_dpi. The object Multifunction_peripheral_B comprises the atomic objects Brand, Link, Model, Picture_jpeg, and Price_USD, and also the non-atomic objects Copier_B, Fax_machine_B, Printer_B, and Scanner_B. The object Multifunction_peripheral_C comprises the atomic objects Brand, Link, Model, Picture_jpeg, and Price_USD, and also the non-atomic objects Copier_C, Fax_machine_C, Printer_C, and Scanner_C. The object Printer_B comprises the atomic objects Duplex_printing, Link, Manufacturer, Max_print_speed_black_ppm, Model, Picture_jpeg, Price_USD, Printing_method, and also the non-atomic object Max_print_resolution. The object Printer_C comprises the atomic objects Brand, Duplex_printing, Link, Model, Picture_jpeg, Max_print_speed_black_ppm, Max_print_speed_color_ppm, Price_USD, and Printing_method, and also the non-atomic object Max_print_resolution. Although not explicitly shown, the query objects Copier_B, Copier_C, Fax_machine_B, Fax_machine_C, Scanner_B, are Scanner_C comprise other query objects.

As can be appreciated, the exemplary thesaurus of FIG. 3 could be used in the printing industry with data sources belonging to parties in the printing industry's value chain, such as manufactures, suppliers, and distributors. Because the query objects are schema independent, the exemplary thesaurus may be used with any number of discrete and heterogeneous data sources. For example, the thesaurus may be used to amalgamate three heterogeneous data sources, one from a printer manufacturer, one from a copier distributor, and one from a scanner reseller. Thus, the thesaurus may increase efficiency in the printing industry by providing a single interface to data sources that were once discrete and isolated.

The thesaurus in FIG. 3 is also an illustrative fragment of a complete thesaurus. In accordance with embodiments of the invention, a thesaurus may comprise any number of query objects and synonyms as desired. As can be appreciated, Printer_B, Printer_C, Scanner_B, Scanner_C, Copier_B, Copier_C, Fax_machine_B, Fax_machine_C, Multifunction_peripheral_B, and Multifunction_peripheral_B represent different classes of printers, scanners, copiers, fax machines multifunctional peripherals respectively. These different classes may be used to integrate heterogeneous objects that logically represent similar objects. For example, Printer_B and Printer_C both represent printers, but Printer_B is a monochrome printer, whereas Printer_C is a color printer, as evidenced by the Max_print_speed_color_ppm field in the Printer_C query object. Thus, the organization of the thesaurus itself may facilitate the querying of heterogeneous data sources by providing independent classes of query objects. In addition, although the exemplary thesaurus is used with printing related objects, any type of data object may be used as desired.

FIG. 4 illustrates an exemplary table of metaobjects that may be included into query objects in accordance with embodiments of the invention. As shown in FIG. 4, the atomic metaobject Advertising_movie_avi has type of file_avi, does not allow standard values specified, and may be implicitly included into other objects. The atomic metaobject Advertising_string has type of string, does not allow standard values specified, and may be implicitly included into other objects. The atomic metaobject Object_semantics has type of string, allows object-specific standard values and their alteration in responses to queries, and does not allow implicit inclusion into other objects. The atomic metaobject Object_version has type of string, allows object-specific standard values but does not allow their alteration, and allows implicit inclusion into other objects. Although four metaobjects are shown in FIG. 4, any number and type of metaobjects may be used as desired.

FIG. 5 illustrates exemplary query objects after inclusion of the standard metaobjects of FIG. 4 in accordance with embodiments of the invention. As shown in FIG. 5, three different object-specific instances of the Object_semantics metaobject are included into three of the query objects. The value of the Object_semantics metaobject in the Multifunction_peripheral_B query object is "Multifunction Monochrome Peripheral"; the value of the Object_semantics metaobject in the Printer_B query object is "Monochrome Printer"; and the value of the Object_semantics metaobject in the Printer_C query object is "Color Printer". As can be appreciated, the metaobjects describe semantics of query objects for query formulation that are produced and included in response to user queries. The metaobjects facilitate the querying of query objects using standard metaobject instances, which may be more informative than the presumably short names of the query objects alone. For example, in the example above, the metaobject reveals the type of printer with more detail than the query object name alone. Thus, the inclusion of metaobjects produces more user-friendly and useful results than standard querying techniques. In addition, the metaobjects may add functionality to a system employing embodiments of the invention. For example, the metaobject Advertising_movie_avi facilitates the inclusion of advertisements and promotional material with a user query. Presenting advertisements to the user, in addition to the results of the user query, increases the functionality of the system by permitting advertisers to associate advertising material with the queries.

Figure 6:
FIG. 6 illustrates an interactive graphical user interface used to generate a query in accordance with embodiments of the invention.

FIG. 6 illustrates an interactive graphical user interface in accordance with embodiments of the invention. For exemplary purposes, the interface uses a representation of the Printer_B query object of FIG. 5. On the top of the interface, the Printer_B query object and the Object_semantics and Object_Version metaobjects are shown. The Object_semantics metaobject has a value of "Monochrome Printer", and the Object_Version metaobject has a value of "007-200070707". A user may utilize the various input fields on the interface to formulate a query. Particularly, FIG. 6 illustrates an example where a user wishes to find all laser printers containing string of symbols 'le' in the manufacturer field, having no duplex mode, allowing a printing speed in black not less than 14 ppm, and allowing a printing resolution not less than 600×600 dpi. The bottom of the interface includes two user preferences. The first user preference determines if a query enhancement should be performed, and when answered positively, will allow matching response to come not only in the form of the Printer_B query object instances but also in the form of instances of other objects that satisfy the search criteria. The second user preference determines what type of advertisement should be included in the response. The two available options are an advertising string or an advertising movie, which are derived from the metaobjects Advertising_string and Advertising_movie_avi of FIG. 4. Although two user preferences are shown in FIG. 6, any number of user preferences may be included as desired. In addition, the interface depicted in FIG. 6 is only exemplary of an interface used to query a query object. The interface may be constructed using one or more of query objects contained in the thesaurus as desired.

As can be appreciated, the layout and type of interface may be changed as desired by adding and removing various types of user inputs, such as checkboxes, radio buttons, drop down boxes, and text entry fields. Moreover, in at least some embodiments, the interface may utilize more than one object. For example, the interface may dynamically create the appropriate user inputs for multiple query objects through programming logic and return results from these query objects as specified by the user search criteria. Such embodiments enable users to quickly find more than one object, e.g., a color printer and a scanner, through the same interface. In addition, although a graphical user interface is used in FIG. 6, any type of user interface may be employed, such as a command line interface, a virtual interface, an auditory interface, and a haptic interface.

FIG. 7 shows the query of FIG. 6 reformulated using an exemplary structured query language in accordance with embodiments of the invention. Like queries formulated using a relational structured query language, such as SQL, the query in FIG. 7 comprises three clauses: SELECT, FROM, and WHERE. However, the exemplary semantics differs from the standard SQL semantics to accommodate the potentially complex structure of the query objects. This is in direct contrast to the "flatness" of the relational tables served by the standard SQL. Another principle difference consists in the source-independent nature of the query in FIG. 7, whereas standard SQL queries always relate to specific databases, specific tables or views of the databases, and specific attributes of the tables or views. In particularly, the SELECT clause of the query in FIG. 7 relates to the query objects rather than the attributes of relational tables. Thus, the asterisk in the SELECT clause means "all complete instances of all query objects specified by the FROM clause that satisfy the WHERE clause" versus the standard SQL meaning of "all columns of a table specified by the FROM clause that satisfy the WHERE clause". Accordingly, the FROM clause also relates to query objects and differs significantly from standard SQL, which does not allow an asterisk in the FROM clause. In the example of FIG. 7, the asterisk in the FROM clause means "any query object of the thesaurus." This formulation reflects the user preference of query enhancement in FIG. 6. If no query enhancement was desired by the user, only the query object or objects used to generate the interface would be queried, in this case Printer_B.

The WHERE clause of the query in FIG. 7 is a compound predicate formed using several elements. First, a function AnyCase( ) specifies that the string constant 'le' inputted by the user in the interface of FIG. 6, as well as the string constant 'laser', must be considered independently of the case of the letters (i.e., upper or lowercase). This function, surrounded by asterisks on the both sides, forms a pattern expression indicating that the 'le' constant may reside in any place of the containing string. Second, a predicate "equals to 'laser' in any case letters" is performed on the Printing_method atomic query object. Third, a predicate Contains( ) specifies that the string values of the Manufacturer atomic object must include string 'le' in any case. Fourth, a predicate "greater or equals 600" is performed on the numeric values of the atomic query objects Max_print_resolution_horisontal_dpi and Max_print_resolution_vertical_dpi. Fifth, a predicate "equals 0" is performed on the boolean values of the atomic object Duplex_ printing. Finally, a predicate "greater or equals 14" is performed on the numeric values of the Max_print_speed_black_ppm atomic object. This compound predicate is the translation of the user query in FIG. 6 to an exemplary structured query language.

FIG. 8 illustrates four sub-queries generated in response to the user input of FIG. 6 in accordance with embodiments of the invention. These sub-queries are alphabetically ordered and formulated using an exemplary query language and illustrate the query enhancement feature specified by the user in FIG. 6. The set of sub-queries is derived from the reformulated query of FIG. 7 using the thesaurus of FIG. 3. Query #3 is directed to the Printer_B query object because Printer_B was the query object used to generate the interface of FIG. 6. This query is produced regardless of whether query enhancement was chosen by the user.

Query #4 is directed to the Printer_C query object because Printer_C comprises all query objects in the WHERE clause of FIG. 7 except Manufacturer. However, the Printer_C query object does contain the Brand synonym for Manufacturer, as defined by the thesaurus of FIG. 3. Thus, a sub-query for the Printer_C query object must be generated. The WHERE clause of Query #4 is identical to the WHERE clause of Query #3 except that Manufacturer is replaced by Brand, again in accordance with the thesaurus of FIG. 3.

Query #2 is directed to the Multifunction_peripheral_C query object because Multifunction_peripheral_C comprises the Printer_C query object as defined by the thesaurus of FIG. 3. The WHERE clauses of Queries #2 and #4 differ because besides the Brand query object contained by Printer_C, Multifunction_peripheral_C contains its own Brand query object as defined by the thesaurus of FIG. 3. Therefore, the predicate Contains( ) must be duplicated to accommodate the second Brand query object. In order to distinguish between the two instances of the Brand query object, Query #2 qualifies each of the two Brand occurrences with the name of the parent query object and the OR logical operator is used to combine the two Contains( ) predicates. Since the name of the Multifunction_peripheral_C query object is relatively long, an alias "a" is defined within the FROM clause which is then used in the WHERE clause to reference this object.

Finally, Query #1 is directed to the Multifunction_peripheral_B query object because Multifunction_peripheral_B comprises the Printer_B query object as defined by the thesaurus of FIG. 3. Query #1 is built analogously to Query #2 with the only variation being that Printer_B contains the Manufacturer query object and Multifunction_peripheral_B contains its synonym, Brand. Therefore, a Contains( ) predicate is added for the Brand query object in addition to the Contains( ) predicate for the Manufacturer query object, as done in Query #3. Since no more semantically distinct queries can be derived using the query of FIG. 7 and the thesaurus of FIG. 3, the sub-query generation process is complete.

Figure 9:
FIG. 9 illustrates an exemplary instance of a query object produced in response to the query in FIG. 6 in accordance with embodiments of the invention.
Figure 11:
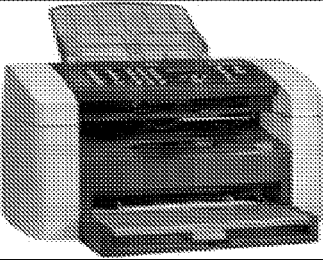
FIG. 11 shows an exemplary instance of a query object produced in response to the query in FIG. 6 in accordance with embodiments of the invention.

FIGS. 9, 10, and 11 depict exemplary responses to the user query of FIG. 6 in accordance with embodiments of the invention. In particular, FIG. 9 represents an exemplary instance of the Printer_B query object produced as a response to Query #3 of FIG. 8. Notice that the query object comprises an instance of the Advertising_string metaobject ("BEST VALUE!"), as indicated by the user in FIG. 6. The darkened elements in FIG. 9 illustrate the values conforming to the WHERE clause of Query #3 of FIG. 8. The name of the Picture_jpeg atomic object is not shown. The metaobject Object_version is also not shown.

FIG. 10 depicts an exemplary instance of the Printer_C query object produced as a response to Query #4 of FIG. 8. Notice that the query object comprises an instance of the Advertising_string metaobject ("WHY BUY BLACK AND WHITE!"), as indicated by the user in FIG. 6. The darkened elements in FIG. 10 illustrate the values conforming to the WHERE clause of Query #4 of FIG. 8. The name of the Picture_jpeg atomic object is not shown. The metaobject Object_version is also not shown.

FIG. 11 shows an exemplary instance of Multifunction_peripheral_B produced as a response to Query #1 of FIG. 8. Notice that the query object comprises an instance of the Advertising_string metaobject ("FOUR IN ONE! A STEAL!"), as indicated by the user in FIG. 6. The darkened elements in FIG. 11 illustrate the values conforming to the WHERE clause of Query #1 of FIG. 8. The name of the Picture_jpeg atomic object is not shown. Metaobject Object_version is not shown. The instances of Copier_B, Fax_machine_B, and Scanner_B query objects are also not shown.

Figure 12:
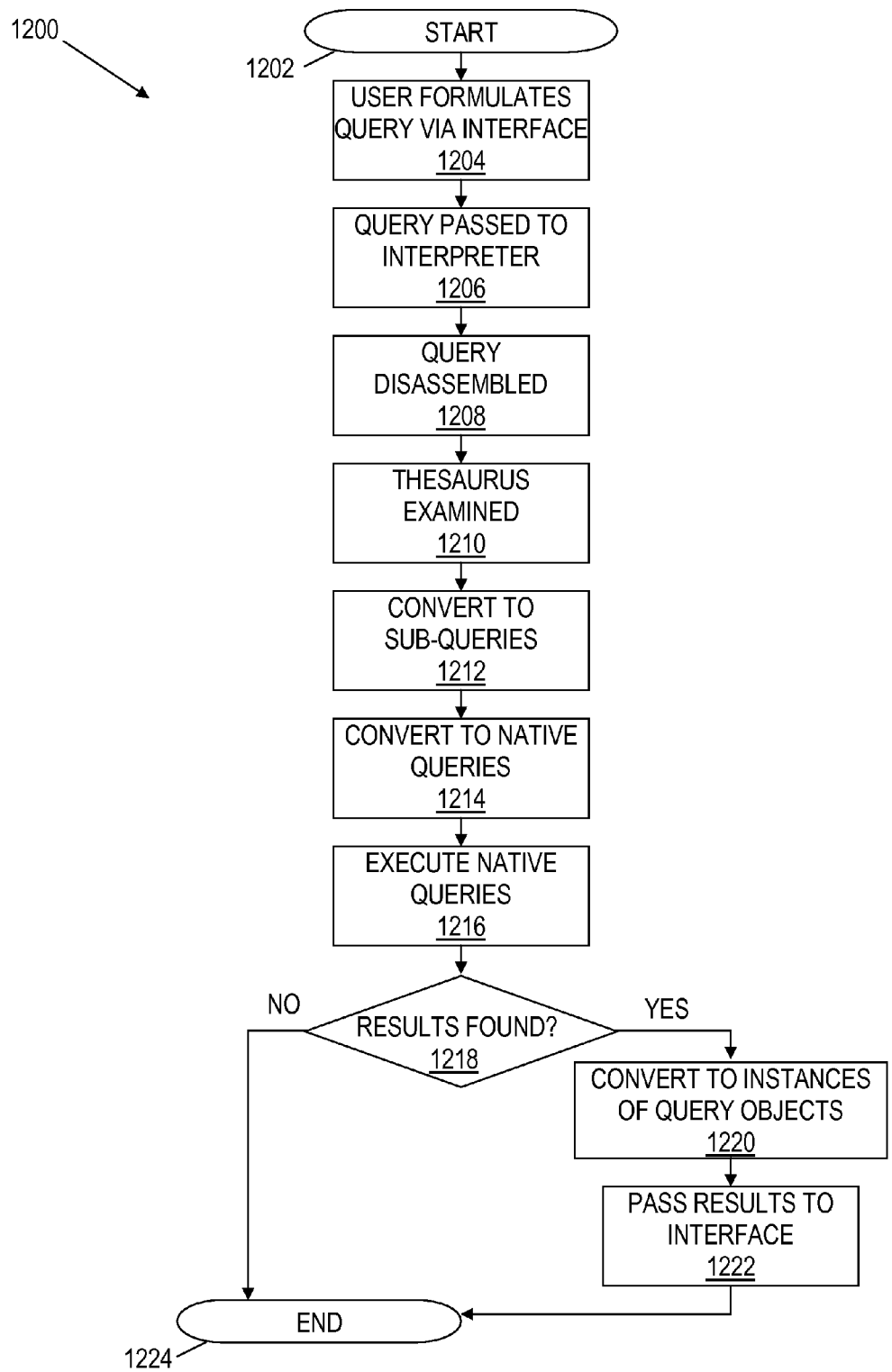
FIG. 12 illustrates an exemplary process of querying heterogeneous data sources in accordance with embodiments of the invention.

FIG. 12 illustrates an exemplary process 1200 of querying heterogeneous data sources in accordance with embodiments of the invention. The process begins (1202) when a user of an interface formulates a query to the data sources (1204). The query is then passed to an interpreter (1206) where the query's syntax is evaluated for a proper format. The query is then disassembled into discrete parts (1208). This disassembly process may entail dividing the query into clauses, as performed in FIG. 7. Based on the results of the disassembly, the thesaurus is examined for query objects, metaobjects, and relations between the query objects that are associated with the query (1210). Utilizing the thesaurus, the query is then converted to one or more sub-queries (1212). For each of the data sources, the sub-queries are then converted into native queries (1214). The native queries are executed against the respective data sources (1216) and if matching results are found (1218), these results are converted to the instances of the query objects (1220) and then passed to the interface (1222) where the user may perceive them. After the results are passed to the interface, or if no results are found in step 1218, the process ends (1224).

In at least some embodiment, the query formulated by the user is stored in a non-volatile storage medium. A user may chose to run the query at a future time and have the results of the query sent via email, SMS text message, Bluetooth, or any other means of transmitting data, such as normal postal mail. In such embodiments, the query may be executed periodically, such as once a day, week, or month. Because the query is preferably stored before the query is disassembled, updates to the thesaurus are reflected in the results.

In still other embodiments, a user may specify a purchase price for a product matching some minimum specifications. When a product for sale is uncovered that is priced at or below the user specified price and satisfies the minimum specifications, the product is automatically purchased for the user. In these embodiments, the user may provide billing information before or after performing the query.

Two examples are provided below to illustrate embodiments of the invention in action at commercial and governmental establishments. Although one or more of these embodiments may be preferred, the embodiments disclosed should not be interpreted, or otherwise used, as limiting the scope of the disclosure, including the claims, unless otherwise specified. The first is an example of how a commercial entity may utilize embodiments of invention, and the second is an example of how a governmental agency may employ embodiments of the invention.

A giant Internet marketplace, Super Duper Shopper (SDS), brings together buyers and sellers. There are three types of sellers: Large, Small, and Tiny, the buyers are either Active or Lazy. Due to stiff competition, the business slows down and SDS aims to beat the rivals by raising customer satisfaction. According to a survey, buyers spend a lot of time locating the right merchandise, especially complex electronics like flat screen TVs, computers, or digital cameras, and also many others. There are two principal ways to locate an item at the SDS website: either by classification or by keywords, neither allowing comparing multiple items. Besides, merchandise descriptions vary significantly in their structure and naming. The research of complex and expensive items may take days and still does not guarantee the best deals. It is much more efficient to search by multiple characteristics of items simultaneously instead of going through dozens or hundreds of descriptions back and forth in order to compare them by several parameters. Millions of hours spent on research can be saved.

SDS decides to use the present invention to get ahead of the competition. They start small in order to gain experience and to estimate results. SDS picks several dozen items and develops a thesaurus of the item descriptions (query objects) with synonymy relations on the item names and features. The thesaurus also includes metaobjects, particularly to enable sellers to insert advertisements into item descriptions buyers receive in search results. The Large sellers are at first skeptical. Their relational databases holding inventories are highly normalized and item descriptions are scattered across many tables, and the record structures are different from the buyer-friendly SDS thesaurus. However, IT finds a solution in a middleware that receives the SDS queries formulated using the thesaurus and translates them into the SQL queries to their databases. The responses combined to match the structure of the query objects are returned in the XML format to the SDS systems which display the real-time search results from multiple sellers to the buyers, who then can buy what they like on the spot. The sellers love to include customized advertisements into the search results for the buyers who are already known to be interested in the related items they query.

The Small sellers do not have much of IT resources. Their inventories are relatively small and the data is kept in databases like MySQL, MS Access, or just in the Excel spreadsheets. They cannot provide online access to their systems or pay for the middleware. SDS has a solution. Their inventory information is currently supplied to SDS using formatted files. SDS creates simple software that converts the files into the same XML format the Large sellers use. The inventory readings and prices of the Small sellers are not real-time. Still their goods and ads will fall into the same search results for the buyers to choose from. The Tiny sellers sell just few things. SDS asks them to insert their data manually on the SDS website like they did previously. The difference is that item descriptions are now standardized using the thesaurus. Thus their goods and ads will also get into the same search results. The Tiny sellers are happy because now they need not invent how to best describe their merchandise for buyers to find it. They know their items and ads will be seen by the buyers.

The Active buyers search for the best deals because they like to do it or in order to buy cheap and resell. They research the market daily or even hourly. SDS is ready to help and suggests storing their queries and running them periodically for the Active buyers. The search results are returned by email or text messaging. Previously that was not possible because querying was not as precise as with query objects and produced too big and noisy responses. The Lazy buyers do not buy every day and hate spending time researching the stuff. Now they are happy because research takes just minutes. They love SDS and recommend it to all their Lazy friends, so the SDS sales grow fast. Though it took some time, the experiment went well for SDS, and even before the financial results were announced, their stock went up on the news about the new technology. Now SDS licenses their thesauruses of query objects and respective data formats to other companies and the whole marketplace becomes more and more organized and efficient for everyone.

Below is an example of how a governmental agency may utilize embodiments of the invention. The government of the Great Country has many departments and agencies that maintain many databases containing valuable information. If the bits and pieces of information scattered across the databases were combined and made available for querying as a whole, the total value of the information would be much higher and could result in a significant advantage for the Great Country. Unfortunately, this became even more evident due to a tragic event. Recently, the Great Country was attacked by terrorists and there were serious indications that the attack could have been prevented if information from several government databases could have been combined. The government realizes the problem and wants to create a scalable solution. It decides to start by integrating an unknown number of databases belonging to several agencies that were recently combined into the Super Agency. Besides the pure data integration problems, there are serious security issues to be addressed because of the sensitive nature of data contained in the source databases.

The Super Contractor hired by the Super Agency decides to use the present invention in order to build a scalable system allowing querying of heterogeneous data from multiple disparate sources in a secure manner. After consultations with representatives of prospective users, an initial thesaurus of query objects is constructed. It includes a relation of synonymy on the query objects and also other relations specific to the nature of the system. The queries are formulated using a graphical user interface and a structured query language allowing expression of queries in terms of query objects specified by the thesaurus.

A brief description of the system is as follows. The thesaurus is classified information. Users log into the system under secure identities. Each secure identity belongs to one or more classes of security. Particularly, depending on the security class a user may see and use only a certain subset of the thesaurus. Each query is assigned a security context that depends on the security class of the query originator and possibly other factors. The data source entities operate in one of two modes: a gray box or a black box. The gray boxes specify their information profiles for the system as sets of relevant query objects from the thesaurus, so that only queries relating to those query objects will be routed to the gray boxes; the information profiles are not revealed to the users. The black boxes do not specify any information profile, so all queries are routed to the black boxes that determine the relevance of the queries on their own. All other functions are the same for gray and black boxes. When any box receives a query, it checks the security context (and the relevance) of the query. Depending on the security context, the query may be ignored or some response data may be obscured or not included in the response, or other actions may be taken. The response is built as follows: the query is converted into one or more native queries formulated in a means of query language or a means of computer programming chosen by the source; the native queries are executed against the native data, for example against one or more databases of the source, producing native responses; the native responses are converted into responses in a form of query objects and formatted for sending out into the system. The responses from all boxes that responded to the query are returned to the query originator. The data source identities in the response messages are obscured by the secure communication network The system has successfully passed all tests and was accepted. It is now being extended by attaching new data sources. The thesaurus is being enriched with new query objects and relations. With time, potentially all databases belonging to the government of the Great Country will be accessible simultaneously with a single query.

The above discussion is meant to be illustrative of the principles and various embodiments of the present invention. Numerous variations and modifications will become apparent to those skilled in the art once the above disclosure is fully appreciated. For example, the thesaurus may link the inventories of several resellers and distributors. These resellers and distributors may specify the minimum purchase price associated with each product they posses, a time frame by which they wish to sell their inventory, and the number of available products in inventory. Users, employing various embodiments of the invention, may indicate their willingness to purchase a product by specifying the maximum price they are willing to pay for a particular product and a duration during which the offer price is valid. Preconfigured logic may sell products to users in an auction style format, i.e., the user with the highest offer price wins the product if the offer is valid within the seller's time frame. In addition, the thesaurus may be translated into any number of languages to support data sources containing information in different languages. For example, a thesaurus built in English may be dynamically translated to Spanish to support Spanish data sources. Thus, embodiments of the invention are source independent in at least two regards: first with regards to the structure of the data sources and second with respect to the language of origin. It is intended that the following claims be interpreted to embrace all such variations and modifications.

What is claimed is:

1. A computer system, comprising:
   one or more central processing unit, one or more memory, one or more user interface device, one or more data storage device, one or more communications interface, wherein said one or more data storage device having control logic for causing configuration of said one or more central processing unit, said control logic comprising:
   querying a plurality of heterogeneously structured data sources stored on said one or more data storage device;
   generating a plurality of query objects that represent queries to the heterogeneously structured data sources that are independent of the structure of the data sources, wherein said query objects comprise other query objects, and are structured hierarchically in multi-level, non-atomic data structures comprising string, numerical, symbolic, or video data; and
   displaying a user interface configured to query the plurality of query objects wherein said user interface is displayed using said user interface device.

2. The computer system of claim 1, wherein said control logic further comprises determining a relation of synonymy or antonymy between the query objects, wherein said determining is performed by utilizing a thesaurus comprising one or more query objects to relate the structured query objects.

3. The computer system of claim 1 wherein the user interface is selected from the group consisting of a graphical user interface, a command line interface, a virtual interface, an auditory interface, and a haptic interface.

4. The computer system of claim 1 wherein one or more query objects further comprise a metaobject that describes at least one of the query objects.

5. The computer system of claim 4 wherein the metaobject comprises an advertisement related to at least one of the query objects.

* * * * *